INVENTOR.
WILLIAM SHOOMAN

INVENTOR.
WILLIAM SHOOMAN

INVENTOR.
WILLIAM SHOOMAN

ORTHOGONAL COMPUTER

Filed Dec. 12, 1961 4 Sheets-Sheet 4

INVENTOR
WILLIAM SHOOMAN
BY Philip D. Amins
Louis Helfgott
ATTORNEYS

United States Patent Office 3,277,449

Patented Oct. 4, 1966

3,277,449
ORTHOGONAL COMPUTER
William Shooman, 3902 Lenawee Ave., Culver City, Calif.
Filed Dec. 12, 1961, Ser. No. 158,666
22 Claims. (Cl. 340—172.5)

This invention relates generally to digital computers, and more particularly to a computer means and method for processing data in a novel manner wherein the time required to process a large quantity of data is greatly reduced.

Conventional digital computers operate on data in a manner which can be termed as horizontal data processing (HDP). Under this process, data is presented and expressed in rows and are handled and operated upon row by row with other rows. For example, the bits or characters of a computer binary number or word are expressed in a computer memory serially in a row ranging from the most significant digit to the least significant digit. Where conventional computing is performed, the different digits of a word are simultaneously transferred and operated upon with the different digits of another word. Thus, a word or number including a horizontal row of digits or bits is processed by combining (adding, subtracting, multiplying, dividing, comparing, etc.) it with another word or number including a similar horizontal row of digits or bits.

Conventional data processing can be quite time-consuming where a large amount of data are involved. Where a group of numbers is to be individually added, for example, respectively to individual numbers of another group of numbers, each additional process between two numbers of the groups requires a finite time for each addition. The result is that the overall time taken to perform the entire operation is a function of the number of data being processed. It is apparent that if there is a large amount of data being processed, the time required to perform the operation may become prohibitive for many types of computation.

Bearing in mind the foregoing, it is a major object of this invention to provide computer means which operate in a novel manner whereby the time required to process a large amount of data is *not* dependent on the *quantity* of data processed.

Another object of this invention is to provide computer means which can perform operations on a large number of data with relatively simple programming.

A further object of the invention is to provide an orthogonal computer which incorporates logic different from a conventional computer whereby a large number of data can be processed with extreme efficiency for many applications.

A still further object of the invention is to provide computer means wherein decision functions necessary for processing data can be easily provided for various operations.

Briefly, and in general terms, the foregoing and other objects are preferably accomplished by providing an orthogonal computer which includes a conventional computer as a base, with additional vertical registers and modifications to give the added capability of vertical addressing as well as horizontal addressing for its memory. The additional structure includes various logical elements which can be programmed to perform different operational instructions.

The invention will be more fully understood and other objects and advantages will become apparent from the following description of an illustrative embodiment of the invention, taken in connection with the attached drawings, in which.

Figure 4:
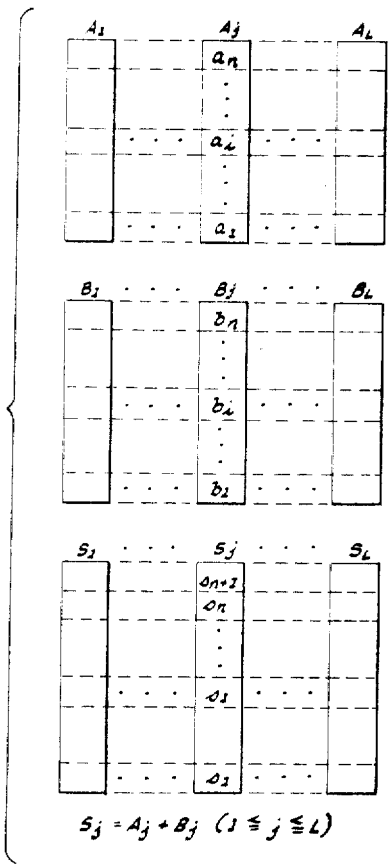
Figure 5:
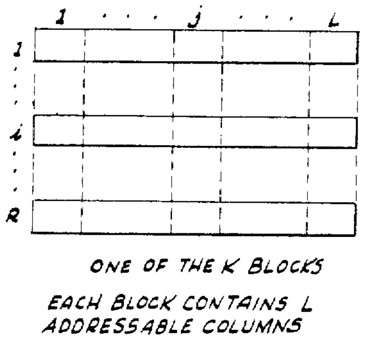
Figure 6:
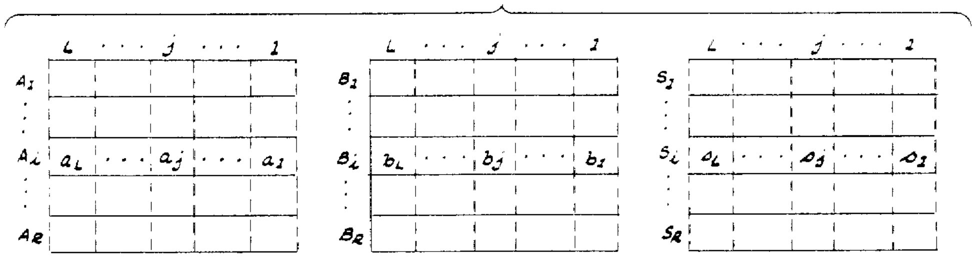
Figure 7:
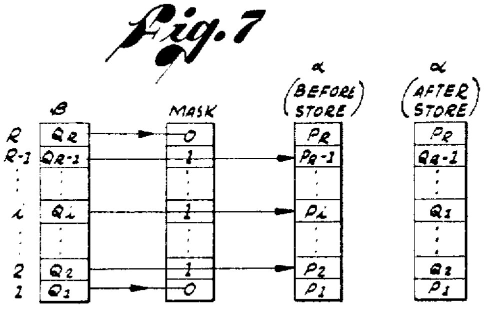
Figure 8:
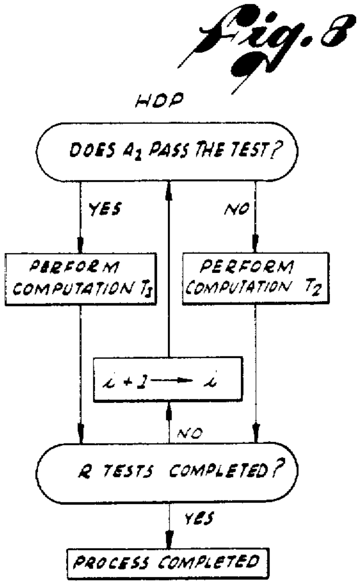
Figure 9:
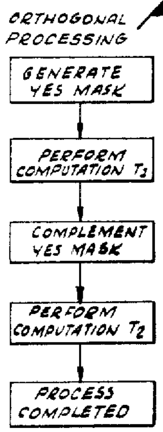
Figure 10:
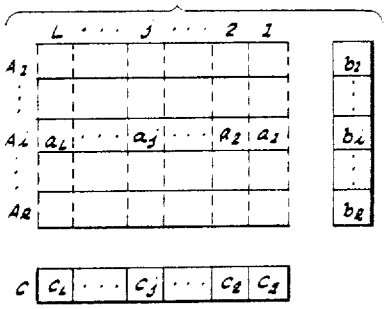
Figures 11, 12, 13, 14:
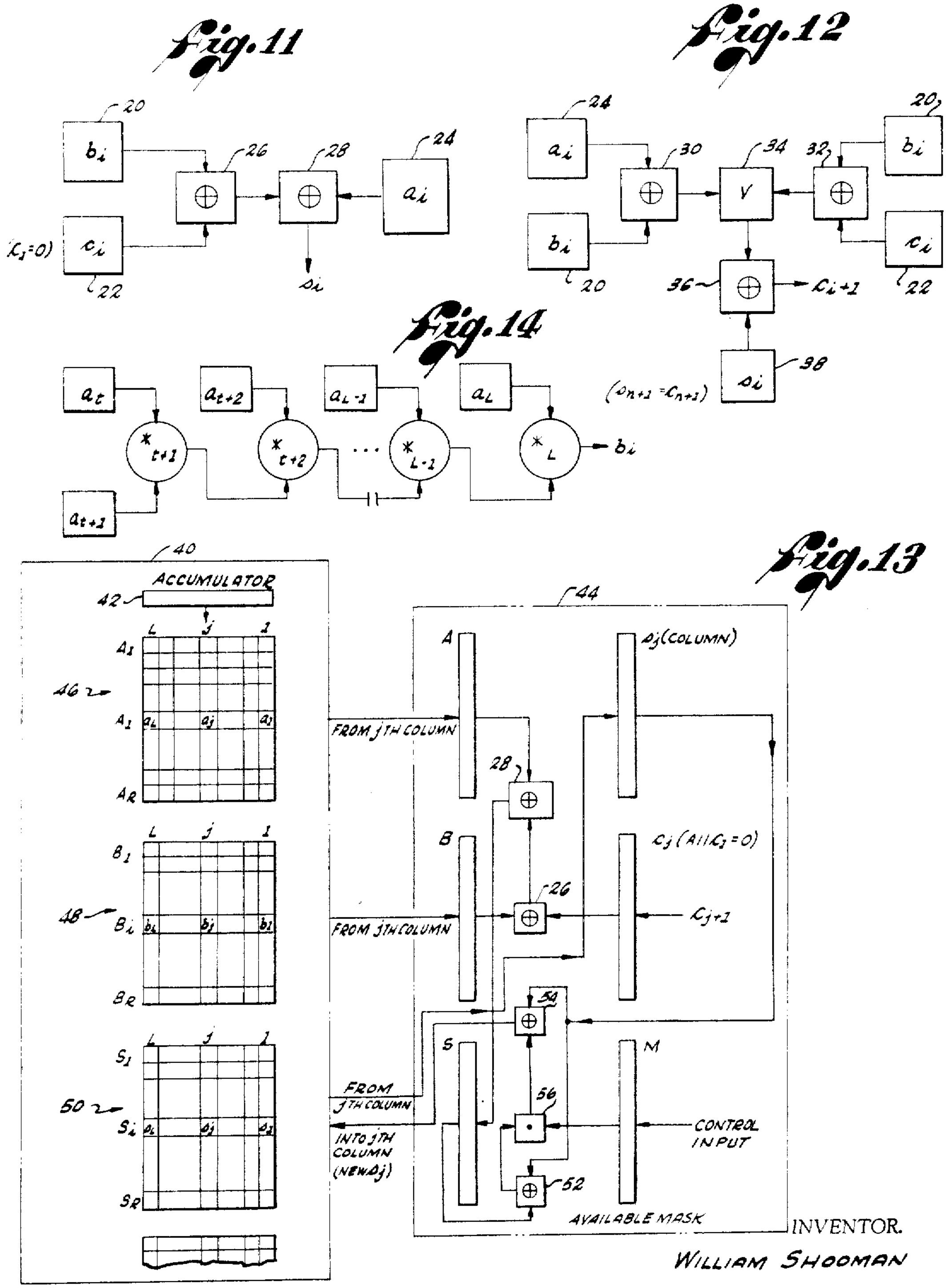
Figure 15:
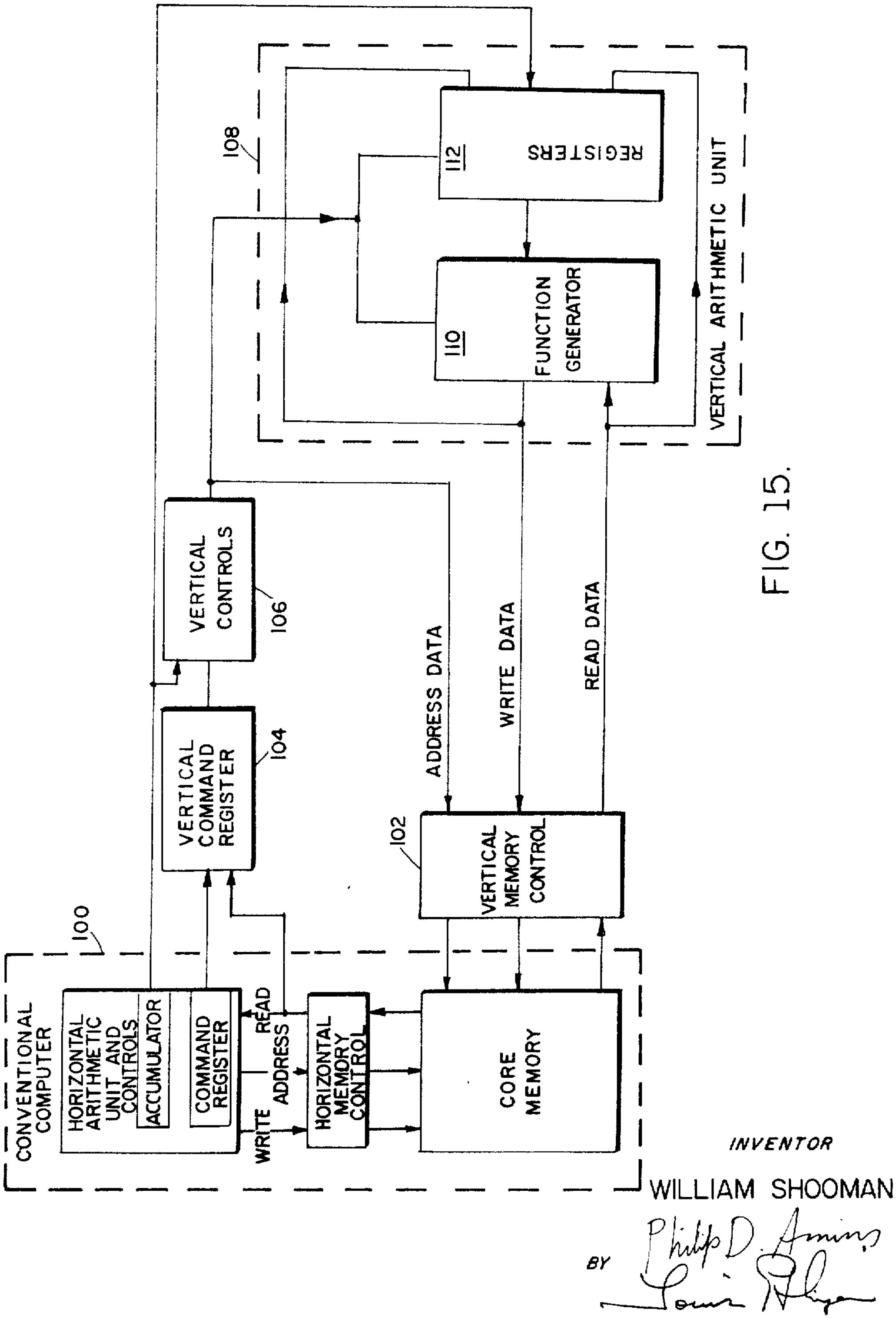

FIGURE 4 diagrammatically shows three memory blocks of a conventional computer having transposed data therein to illustrate execution of an addition algorithm in the computer;

FIGURE 5 shows one of K blocks in the memory of the orthogonal computer;

FIGURE 6 diagrammatically illustrates three memory blocks in the orthogonal computer involved in an addition process;

FIGURE 7 is a functional diagram illustrating the use of a decision-making function in performing a storing process of data;

FIGURES 8 and 9 are functional diagrams which schematically illustrate the use of a mask as a decision function;

FIGURE 10 diagrammatically represents a sequence of binary numbers which is compared with a reference binary number to generate bits in a vertical register indicative of the comparative results;

FIGURE 11 is a block diagram showing implementation of Boolean Equation A for orthogonal processing;

FIGURE 12 shows the implementation of Boolean Equation B for the addition process;

FIGURE 13 shows the orthogonal computer with certain of its additional elements and components; and FIGURE 14 is a block diagram illustrating implementation of the "compare>" algorithm;

FIGURE 15 is a block diagram of an orthogonal computer constructed in accordance with the present invention and having a conventional computer as the base thereof.

*Data organization for vertical data processing (VDP)*

Figure 1:
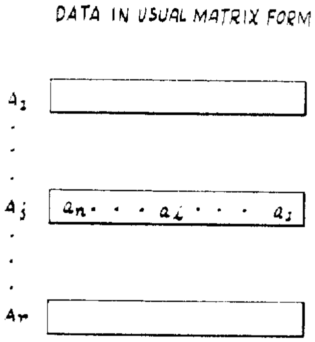
FIGURE 1 is a diagrammatic drawing depicting data expressed in the usual matrix form in a conventional computer.
Figure 2:
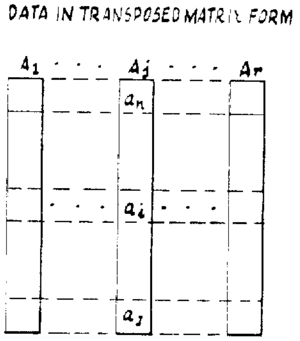
FIGURE 2 shows the data of FIGURE 1 in a transposed matrix form for use in a conventional computer using vertical data processing methods.

Assume that $r$ numbers $(A_j)$ are provided in a conventional computer. These numbers are normally expressed, for example, in a memory such as a magnetic core type by a matrix of bits. In the usual matrix each number is in a computer word or row of the matrix as indicated in FIGURE 1. In a conventional computer, using VDP methods, the numbers are expressed by a transpose of the usual matrix. Data in transposed matrix form is then as illustrated in FIGURE 2. In FIGURES 1, 2, 4, 5, 6 and 10, solid lines are used to indicate data organization, while broken lines are used to indicate orientation of addressing.

In the transposed matrix, each number is in a column of the matrix; consequently each bit of a number is in a different computer word. Since the conventional machine has direct access to computer words only, it is not possible to obtain any of the $r$ numbers directly. However, the computer word which contains the $i$th bit of $A_j$, also contains the $i$th bit of each of the $r$ numbers.

*VDP addition*

Figure 3:
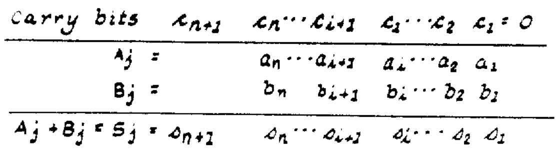
FIGURE 3 shows data arranged to illustrate the process of adding two binary numbers.

Let two sequences of numbers $(A_j)$ and $(B_j)$ $$(1 \leq j \leq L)$$

each of bit length $n$, be expressed in transposed matrix form in a conventional computer. For the sake of simplicity, assume that all numbers are non-negative. Signed data does not change the theory. The L sums $S_j = A_j + B_j$ can be computed simultaneously using VDP addition. To discuss this addition, consider first a slight formalization of the process a human uses in adding two binary numbers. Referring to FIGURE 3, let $c_1$ be a dummy carry bit equal to zero; then $s_1=1$, if and only if an odd number of the three bits $c_1$, $a_1$, $b_1$, are one bits. To use the same procedure for $s_2$, the second carry bit, $c_2$, is needed but which is not as yet obtained. Now $c_2=1$, if and only if at least two of the three bits $c_1$, $a_1$, $b_1$, are one bits. Since $c_1$, $a_1$, $b_1$ are known, $c_2$ can be determined, and $s_2$ can be computed as was $s_1$. In general, if we have $c_i$, $a_i$, $b_i$, both $s_i$ and $c_{i+1}$ can be computed, thus generating each bit of the sum $S_j$. To perform VDP addition, it is this conventional serial addition which is duplicated by means of an algorithm consisting of two Boolean equations; Equation A for $s_i$, and Equation B for $c_{i+1}$ $(1 \leq i \leq n)$.

$$s_i = a_i \oplus (b_i \oplus c_i);\ c_1 = 0 \qquad \text{(Equation A)}$$

$$c_{i+1} = [(a_i \oplus b_i) V (b_i \oplus c_i)] \oplus s_i$$
$$s_{n+1} = c_{n+1} \qquad \text{(Equation B)}$$

"⊕" stands for "exclusive or," and "V" for "inclusive or."

As is well known, an "exclusive or" element is one which produces an output signal only when the two input signals thereto are not the same. For example, when the input signals respectively represent the contents of two memory stages, a one binary output signal is obtained when the input signals are different, and a zero binary output signal is obtained when the input signals both represent binary zeros or ones. An "inclusive or" element produces a one binary output signal for all binary combinations of the two binary representative input signals thereto, except when both input signals represent binary zeros, which then produces a zero binary output signal. The "and" element produces a binary one output signal if and only if both input signals thereto represent binary ones.

By utilizing computer logic elements suitably, the Boolean Equation A and Equation B can be implementated as shown in FIGURES 11 and 12, respectively. In FIGURE 11, block 20 represents the *i*th stage of the $B_j$ register, and block 22 represents the *i*th stage of a $C_j$ carry register. In the vertical carry register stage 22, $c_1$ is set equal to zero as indicated. Block 24 similarly represents the *i*th stage of the $A_j$ register. Respective signals $b_i$ and $c_i$ are applied to an "exclusive or" element 26, and the output thereof is applied to another "exclusive or" element 28 which has the signal $a_i$ also provided thereto. The output signal from element 28 is $s_i$ according to Boolean Equation A.

In FIGURE 12, the signals $a_i$ and $b_i$ are applied to "exclusive or" element 30, and signals $b_i$ and $c_i$ are applied to "exclusive or" element 32 as indicated. The outputs from elements 30 and 32 are applied to "inclusive or" element 34 and the output therefrom is provided to "exclusive or" element 36. The signal $s_i$, obtained from Boolean Equation A, from the *i*th stage 38 of the $S_j$ register is applied to element 36 and is subject to the indicated condition that $s_{n+1}$ equal $c_{n+1}$. Besides forming the sum, the overflow from the final addition is also available in 38 by resetting the *a* and *b* registers, 24 and 20. If desired, the overflow column can be written into a vertical address in memory. The output signal from element 36 is then $c_{i+1}$, according to Boolean Equation B. It is to be understood, of course, that the implementations shown in FIGURES 11 and 12 are for illustrative purposes only, and other implementations are possible. This is readily apparent when Boolean Equation A and Equation B are varied according to the various manipulative laws which are permissible in Boolean algebra, and computer programming is correspondingly varied.

When a Boolean operation is performed on two computer words, the result is a computer word whose *j*th bit (FIGURE 4) is a function *only* of the operation and the *j*th bit of each of the two computer words. Thus, in the computer, a Boolean operation actually generates L (L is the bit length of the computer word) simultaneous operations, each independent of the others. In executing the addition algorithm in the computer, $a_1$ is obtained by accessing the computer word containing $a_1$, which computer word also contains the least significant bit of each of the members $A_j$, where $1 \leq j \leq L$. Similarly, $b_1$ is obtained by accessing the computer word containing the least significant bit of each of the members $B_j$, where $1 \leq j \leq L$. A selected computer word is preset to zero, and each of its L bits is a zero carry bit, one for each of the L pairs $A_j$, $B_j$. Therefore, in computing $s_1$ by means of the Boolean Equation A, the 1st bit for each of the L sums ($S_j$) is actually computed, wherein the first carry bit is zero and obtained from the zero preset computer word described above (as shown in FIGURE 3). Similarly, $c_2$ and the remaining L–1 second carry bits can be computed by means of the Boolean Equation B for $c_{i+1}$ and stored in the computer word containing the dummy carry bits, thereby replacing them. Then Boolean Equation A for $s_i$ can again be used to compute each 2nd bit of the L sums, and so on, thus generating the L sums $A_j+B_j$, where $1 \leq j \leq L$. Thus, there are effectively L serial operations which are being performed simultaneously.

The number of memory cycles needed to execute the VDP addition algorithm is clearly a function of $n$ only, where $n$ is the bit length of the words or data fields being summed. This implies that timing for VDP addition is *not* a function of the quantity of words or data fields processed. This extremely important property is shared by *all* VDP instructions, which include the arithmetic and logical operations usual to conventional computers.

An important limitation in using VDP techniques, one of which is writing in data vertically, in a conventional computer is that the quantity of data which can be simultaneously processed is bounded by the bit length of the computer word. Another limitation is that data must be fed in vertically (which creates some difficulty), or fed in horizontally and then transposed. Finally, vertical data is not suitable for horizontal data processing (HDP), although it is clear that some operations are performed more efficiently by conventional methods (for example, summing two numbers). These limitations are removed in a new computer which is now described.

*The orthogonal computer*

The new computer, as shown in FIGURE 15, has as its base a conventional computer 100 which, by way of illustration, may be an IBM 704 or an IBM 7090. However, other conventional computers may also be utilized. In addition to the conventional computer 100, there is provided a vertical memory control 102 which gives the added capability of vertical addressing. There is also provided a vertical command register 104, vertical controls 106, and a vertical arithmetic unit 108 which includes a function generator 110 and registers 112. One way of achieving both vertical and horizontal addressing is to use double aperture cores in each bit position where the double addressing capability is desired in the memory. There are K non-overlapping blocks of double addressing memory, each block consisting of R consecutive memory locations. One of the K blocks is schematically shown in FIGURE 5.

The vertical addressing is to be restricted so that each addressable column consists of precisely R bits and is contained in *one* of the blocks. There are therefore L addressable columns in each block, and a total of $K \times L$ addressable columns. The central processor, or the vertical arithmetic unit 108, has a number of vertical registers 112 (each contains R flip-flops). A function generator 110, which by way of illustration may contain the logic circuits shown in FIGURES 11 and 12, to perform computations directly by means of vertical addressing. A vertical accumulator is not needed. While a computation is being performed in a subset of the K blocks, input/output (I/O) may be performed in any other part of memory. This machine will be referred to hereinafter simply as the orthogonal computer.

Parallel processing is achieved in the orthogonal computer by *vertically* addressing *horizontal* data. This is analogous to the VDP procedure described for the conventional computer (*horizontally* addressing *vertical* data) since an addressable column which contains the *j*th bit of a number, also contains the *j*th bit of each of the R numbers being processed. The limitations which led to the design of the orthogonal computer are clearly eliminated when data is fed in horizontally, said limitations having previously been discussed in connection with VDP techniques.

In computing the R sums $S_i = A_i + B_i$ in the orthogonal computer, let L be the bit length of each of the 3R numbers as indicated in FIGURE 6 (all numbers are assumed to be non-negative for simplicity). The number of memory cycles needed for the orthogonal addition is $3L+1$. For expediency, since the sum block of FIGURE 6 has only L columns, the last carry bits are assumed to be zero. It is herein to be noted that the number of memory cycles is denoted as $3L+1$, where the 1 denotes the cycle time needed for command pickup. Using conventional methods in a conventional computer, such as a member of the IBM 704, 709, 7090, 7094 class, 8R memory cycles are generally required to compute the R sums. This occurs from a four command loop having two memory cycles per command. For this type of addition, with R equal to on the order of 1000, the orthogonal computer is 55 to 500 times as fast as a conventional machine; where 55 corresponds to bit length 48, and 500 to bit length 5. Here is another important property of VDP addition; the speed of orthogonal addition increases as the bit length of the data decreases. This property is also shared by *every* orthogonal instruction.

*The orthogonal computer instruction*

A typical instruction consists of operation code, three addresses ($A_j$), and three parameters ($P_j$). $P_j$ specifies the bit length of the corresponding operand at $A_j$. Each $A_j$ refers to: (1) one of the KL addressable columns, or (2) one of several vertical flip-flop registers. One of the ($A_j$) can refer to a specified horizontal register of flip-flops, preferably the HDP accumulator, such as that shown in the conventional computer 100 in FIGURE 15. The HDP accumulator holds the constant used in the "compare" and "constant insert" instructions; it also holds the constant for subtracting, multiplying, and dividing the numbers of a block by that constant. Not all instructions use all fields.

| Instruction List | Timing (The approximate number of memory cycles exclusive of those necessary to fetch the instruction) |
|---|---|
| Arithmetic: | |
| Add | $P_1+P_2+P_3$ |
| Add magnitude | |
| Subtract | |
| Subtract magnitude | |
| Multiply | $P_1\frac{(3P_2+P_3+1)}{2}+P_3$ If $P_1=P_2$ and $P_3=2P_1$, this reduces to $\frac{5P_1^2+6P_1}{2}$ |
| Multiply magnitude | |
| Multiply and accumulate | |
| Divide | |
| Divide magnitude | |
| Compare: | |
| Compare greater than | The larger of $P_1$ and $P_2$ |
| Compare equal to | |
| Compare equal to or greater than | |
| Store: | |
| Move column | 2 |
| Constant insert | $2P_1$ |
| Logical: | |
| And | 2 |
| Inclusive or | 2 |
| Exclusive or | 2 |
| One's complement | 2 |
| Count ones | 1 |

*Problems suited for the orthogonal computer and the HDP branch*

A problem is suitable for orthogonal computing if there is multiple data undergoing the same transformation. In general, data must be tested to determine which transformation need be applied. The branch point and "transfer control" function is the conventional method used. A branch point, as is well known to those skilled in the art, refers to a point in a program at which a decision as to which of at least two transformations (computations) is to be performed, and transfer control is, of course, believed to be self-explanatory. It has probably occurred to the reader that this method will not work in the orthogonal computer since processing is accomplished by accessing R bits, one from each of the R numbers being processed in parallel. There is, however, an orthogonal procedure which is the analogue of the conventional method. To understand this procedure, orthogonal storing is first examined.

Storing, or equivalently, writing in memory in the orthogonal mode, consists of replacing some of the R bits in one of the addressable columns, by the corresponding bits in a vertical register. When storing in an addressable column $\alpha$, from a vertical register $\beta$, whenever a store is to be performed during any orthogonal operation, a collating mask as shown in FIGURE 7 is automatically employed as follows: If the *i*th bit in the mask is a "one bit," then the *i*th bit in $\alpha$ is replaced by the *i*th bit in $\beta$. If the *i*th bit in the mask is a "zero bit," then the *i*th bit in $\alpha$ is left undisturbed. A "mask" is a vertical register containing R bits.

The mask used as a decision function is illustrated in FIGURE 9, and is compared to the conventional method shown in FIGURE 8. When R numbers ($A_i$) are being processed in an HDP program, and a branch point is reached, each of the R numbers must be tested. Let a computation $T_1$ be performed if a number passes the test, otherwise $T_2$. Assume that *n* numbers pass the test and that $R-n$ therefore do not. At that point in the orthogonal program corresponding to the conventional branch, a mask is generated whose *i*th bit is a "one bit," if and only if $A_i$ passes the test. Computation $T_1$ is then performed on all R numbers simultaneously, using this "yes mask," the "yes mask" being used to qualify data transfer, whereby a "one bit" in the mask permits the transfer to occur and a "zero bit" inhibits the transfer. Since there are exactly *n* "one bits' in the mask, each corresponding to one of the *n* numbers which pass the test, $T_1$ affects only those memory locations which are associated with the *n* numbers which pass the test. The mask is then complemented and used in the $T_2$ computation on all R numbers, and $T_2$ therefore affects only those memory locations associated with the $R-n$ numbers which fail the test.

The orthogonal computer is diagrammatically shown in FIGURE 13. As mentioned above, the orthogonal computer has as its base a conventional computer 40. The memory of the computer 40, however, has the added capability of being vertically addressable as well as horizontally. This is accomplished in one manner by use of double aperture cores in the memory. One of the apertures of the cores is wired for horizontal addressing and the other for vertical addressing. A conventional accumulator 42 is operatively associated with the memory in the usual manner, and other standard computer components have not been shown. Further, only three blocks of the memory have been shown in FIGURE 13 for purposes of illustration. Additional vertical registers and operative elements are indicated in the block 44.

Additional vertical registers A, B, S, $c_j$ (column), $s_j$ (column), and mask M are indicated in the block 44. Also, "exclusive or" elements 26 and 28 are shown therein. Other elements, some of which are shown in FIGURES 12 and 14, have not been depicted in block 44. While separate and different vertical registers, such as A, B, S, etc., have been indicated in block 44 of FIGURE 13, it is possible to use only one vertical register with suitable programming. It is to be noted that the *j* symbol in FIGURE 13 corresponds to the *i* symbol in FIGURES 11 and 12.

The *j*th column contents of the first memory block 46 is provided to the vertical register A, the $j$th column of the second memory block 48 is provided to the vertical register B, and the $j$th column of memory block 50 is provided to the $s_j$ (column) vertical register. A single line functional connection is used here to represent a plurality of parallel leads which are connected to respective stages of the different registers. Correct values for $c_{j+1}$ are provided to the register $c_j$ (column) as obtained according to the implementation of FIGURE 12.

The algorithm given by Boolean Equation C is used to control which of the bits of register S are to be stored in column $s_j$ of block 50 in FIGURE 13.

$$s_j(\text{new}=[S\oplus s_j)\cdot M]\oplus s_j \qquad \text{(Equation C)}$$

The elements 26 and 28 are employed with registers A, B, $c_j$ (column), and S according to Boolean Equation A. In like manner, the "exclusive or" elements 52 and 54, and the "and" element 56 are functionally connected with registers $s_j$ (column), S and M as shown in FIGURE 13, to conform with Equation C. Previous values of $s$ in the $j$th column of memory block 50 are provided to register $s_j$ (column). Register $s_j$ (column) and register S are then provided as inputs to element 52. The mask M and the output of element 52 are then applied to "and" element 56 as the inputs thereto. The output of "and" element 56 and the $s_j$ (column) are provided as inputs to "exclusive or" element 54, and the output from element 54 provides new $s$ values for the $j$th column of memory block 50. The transfer of newly generated values of $s_j$ to the memory block 50 is qualified, i.e., permitted or inhibited, by the contents of the mask M, on a bit-by-bit basis. The elements 26, 28, 52, 54, 56 and other similar elements, are shown to represent one channel for each register stage that each serves, or alternatively, the shown elements represent a connection which is switched to the different stages of a register.

*"Compare Greater Than" function and algorithm*

A set of instructions called "compare" plays a significant role in VDP on various levels. A description and algorithm is now given for the "Compare Greater Than" function, hereinafter referred to as "compare>." This instruction compares a constant, C, to each number in a sequence of numbers $(A_i)$ $1\leqq i\leqq R$. All numbers are assumed non-negative for simplicity. A column of R bits $(b_i)$ is to be generated, such that $b_i$ is a "one bit" if and only if $A_i>C$. The binary representations of $A_i$ and C are as follows:

$$A_i=a_L \ldots a_j \ldots a_2a_1$$
$$C=c_L \ldots c_j \ldots c_2c_1$$

as shown in FIGURE 10.

Let $$C'=c_L \ldots c_j \ldots c_t$$

where $c_t$ is the least significant zero bit of C, whereby $$c_{t-1} \ldots c_2c_1$$

are all one bits.

Let $b_i$ be represented as follows:

$$b_i=a_L*_L\{a_{L-1}*_{L-1}[\ \ldots\ (a_j*_j\{\ \ldots\ [a_{t+2}*_{t+2}(a_{t+1}*_{t+1}a_t)]\ \ldots\ \})\ \ldots\ ]\}$$

If the $j$th bit of C, where $(t<j\leqq L)$ is a zero bit, then "$*_j$" is interpreted as the Boolean operator "inclusive or"; if it is a "one bit," then "$*_j$" is interpreted as the Boolean operator "and." Since the horizontal data $(A_i)(1\leqq i\leqq R)$ are vertically addressed, the above algorithm for $b_i$, executed in the orthogonal computer, generates all the $b_i(1\leqq i\leqq R)$. The number of memory cycles needed to execute "compare>" is $L-t+1$, the bit length of C'. Implementation of the "compare>" algorithm is shown in FIGURE 14. The bits $a_t$ and $a_{t+1}$ are applied as inputs to element $*_{t+1}$ and the output thereof is applied to element $*_{t+2}$ as one input thereto. Bit $a_{t+2}$ is provided as the other input to element $*_{t+2}$ and the output therefrom is applied to another element as before, until finally the output of element $*_L$ is obtained, which is $b_i$. As noted above, each of the elements $*_{t+1}$, $*_{t+2}$, . . . $*_{L-1}$, $*_L$ represents an "inclusive or" element or an "and" element according to the $j$th bit of C. Since C' is known for any specific C, the noted elements are fully established for any particular case. These elements can be then suitably connected up in the computer according to FIGURE 14.

The following example shows how "compare<" generates a mask to be used as a decision function. "Compare<" compares a constant to a sequence of R numbers and generates a column of R bits, whose $i$th bit is a "one bit" if and only if the $i$th number in the sequence is *less* than the constant. Suppose that the social security deductions in a payroll program are being computed. For each payroll period, 3% of total income is deducted and accumulated until the accumulated total is equal to or greater than \$144. Let R accumulated totals be given, and let \$144 play the role of constant. "Compare<" can generate a column of R bits, whose $i$th bit is a "one bit" if and only if the $i$th total is less than \$144. All R totals are then simultaneously incremented, using the column of R bits as the mask. Consequently, only those totals which are less than \$144 are actually incremented. The number of memory accesses needed to execute "compare<" is also $L-t+2$, where $c_t$ is the least significant *one* bit of C. (Previously, in "compare>," $c_t$ of C' is the least significant *zero* bit of C.) In this problem $C=14400$, which consists of 14 bits, whose least significant six bits are zeros. Therefore $L=14$ and $t=7$, so that 9 memory accesses are needed to execute this "compare<." Each time this VDP instruction is performed in this problem, R comparisons are necessary using conventional methods. About six memory accesses are generally needed to perform a conventional comparison. For this function, with $R=1000$, the orthogonal computer is approximately 660 times as fast as a conventional computer.

Another application for "compare<" is given by the following example. Let C be a particular number in a given sequence of R numbers $(A_i)$, each of bit length $n$. Suppose that $k$ of these numbers are less than C. This number K is frequently referred to as the "rank of C" in the sequence. If we let C play the role of constant, "compare<" can generate a column of R bits whose $i$th bit is a "one bit" if and only if $A_i<C$. This column of R bits therefore contains exactly $k$ one bits. Assume that we have an instruction which counts the one bits in a vertical register. It then takes approximately $n+3$ memory accesses to compute rank in the orthogonal computer. The number of consecutive least significant zero bits of C can be substracted from the $n+3$ memory accesses. If the R numbers are not sorted, $R-1$ comparisons are needed to compute rank in an HDP machine. For $R=1000$, the orthogonal computer is from 155 $(n=48)$ to 750 $(n=5)$ times as fast as a conventional machine in computing the rank of a number in an unsorted sequence.

*Compiler application*

Every compiler includes an assembler that translates the instruction list from mnemonic to machine language. The orthogonal computer readily lends itself to the translation problem by means of the "Constant Insert" instruction through a "compare=" mask.

A detailed description of the orthogonal translation and time comparison to conventional translation is given in a paper titled "Parallel Computing with Vertical Data," by William Shooman. This paper was published in the Proceedings of the Eastern Joint Computer Conference, Winter Session, 1960.

*Storage economy by packing data*

The KL addressable columns in the orthogonal computer may be thought of as a matrix of R rows and KL columns. Suppose that there are $t$ fields of data $(A_i^j)(1\leqq j\leqq t;\ 1\leqq i\leqq R)$. Let $n_j$ be the bit length of the data in the field $A_i^j$. Let $$\sum_{j=1}^{t} n_j = N$$

All $t$ fields can be packed into *any* N consecutive columns, and processed with no loss of speed or generality, provided that N is not too large, i.e., $N\leqq KL$. This capability of using the generally unused portion of computer words is not attainable in conventional computers without corresponding loss of speed. Because of the packing capability, it follows that the orthogonal computer can process horizontal data whose bit length is greater than L, the bit length of the computer word, with no loss of speed other than the usual speed decrease as the bit length of the data word increases, so that, for example, time consuming double precision routines are not needed in the orthogonal computer. The program can preset the size of the field, and if the mechanization and word size permit, a minor address field can be contained in the command which determines the length of the operands. Each memory cycle (or 2 or 3, depending on the number of addresses used) the base addresses are incremented, the field decremented, and the command finishes when the field counts down to zero.

A computer is said to be input/output (I/O) limited, if a significant portion of machine time is spent waiting (i.e., not computing), while input/output is being performed. Computing is so fast in the orthogonal computer that input/output limitations may present a problem. For $K=3$ (with reasonable R), there are many classes of problems for which the machine would be I/O limited. Flexibility with which to combat the I/O problem increases with increasing K, for fixed R; so also does the cost of the machine. As R increases, total orthogonal computing time for all R numbers remains constant, but I/O time per block and the cost of the machine increases. These are some of the considerations involved in choosing R and K.

*Summary*

It is thus seen that there has been provided novel technique for the simultaneous processing of multiple data in digital computers. This technique is called orthogonal data processing in contrast to conventional methods which was referred to as horizontal data processing (HDP). Data organization for orthogonal processing was described, and it has been shown that the time taken to perform any orthogonal operation is *not* a function of the *quantity* of data being processed, but is a function of the bit length of the data field being processed.

A conventional machine which processes vertical data has been shown to have certain limitations which are removed by a new computer design, called the orthogonal computer. Descriptions and algorithms for several orthogonal instructions (one of which is an "add" instruction) have also been discussed.

Orthogonal logic has been shown to be strikingly different from that of HDP. Masks play the role of decision functions with the result that there is virtually *no* branching in the orthogonal mode. The orthogonal computer has been applied to the specific problems of (1) FICA computation, (2) finding the rank of a number in a sequence of numbers. Time comparisons have been made, and it has been shown that the orthogonal computer is from 115 to 750 times as fast as a conventional machine for the above problems. It has been shown that storage economy can be achieved by packing data. Finally, possible input/output limitations of the orthogonal computer have been noted.

The orthogonal computer includes all of the necessary structure for performing the various instructions listed previously. Examples of how this structure is utilized has been shown above, and other operations are similarly performed. This is especially true when it is observed that many operations consist of a reiterative process of simpler operations.

It is to be understood that the particular embodiment of the invention described above and shown in the drawings is merely illustrative of and not restrictive on the broad invention, and that various changes in design, structure, and arrangement may be made without departing from the spirit and scope of the broader aspects of the invention as defined in the appended claims.

I claim:

1. An orthogonal computer comprising:
a digital memory for data storage,
a register, and
a function generator,
said memory having a plurality of memory locations horizontally storing data therein,
means for vertically addressing said digital memory,
means for horizontally addressing said digital memory,
said horizontal and vertical addressing means being capable of writing in and reading out data,
means for transferring vertical columns of data from said memory to said register,
means for transferring said vertical columns of data from said register to said function generator,
means for performing logic operations upon said vertical columns of data in said function generator to produce resultant vertical columns of data,
and means for transferring said resultant vertical columns of data from said function generator to said digital memory.

2. An orthogonal computer comprising:
a digital memory for data storage,
a register, and
a function generator,
said memory having a plurality of memory locations horizontally storing data therein,
means for vertically addressing said digital memory,
means for horizontally addressing said digital memory,
said horizontal and vertical addressing means being capable of writing in and reading out data,
means for transferring vertical columns of data from said memory to said register,
means for transferring said vertical columns of data from said register to said function generator,
means for performing logic operations upon said vertical columns of data in said function generator to produce resultant vertical columns of data,
and means for transferring said resultant vertical columns of data from said function generator to said register.

3. An orthogonal computer comprising a digital memory for data storage having at least three individual memory blocks,
each of said memory blocks having a plurality of memory locations for horizontally storing data therein,
write-in, read-out means for horizontally and vertically writing in and reading out data from each of said memory blocks in a selective manner,
at least one register having a plurality of vertically disposed storage elements therein equal to the number of memory locations in any one of said memory blocks,
means for transferring a vertical column of data from said write-in, read-out means to at least one of said registers,
a function generator,
means for transferring said vertical column of data from at least one of said registers to said function generator,
means for performing logic operations upon said vertical column of data in said function generator to produce a resultant vertical column of data, and means for transferring said resultant vertical column of data from said function generator to said write-in, read-out means.

4. An orthogonal computer comprising a digital memory for data storage having at least three individual memory blocks, each of said memory blocks having a plurality of memory locations for horizontally storing data therein, write-in, read-out means for horizontally and vertically writing in and reading out data from each of said memory blocks in a selective manner, at least one register having a plurality of vertically disposed storage elements therein equal to the number of memory locations in any one of said memory blocks, means for transferring a vertical column of data from said write-in, read-out means to at least one of said registers, a function generator, means for transferring said vertical column of data from at least one of said registers to said function generator, means for performing logic operations upon said vertical column of data in said function generator to produce a resultant vertical column of data, and means for transferring said resultant vertical column of data from said function generator to at least one of said registers.

5. An orthogonal computer in accordance with claim 3, including means for transferring another vertical column of data from said write-in, read-out means to said function generator, means for performing logic operations upon the two said vertical columns of data in said function generator to produce a resultant vertical column of data, and means for transferring said resultant vertical column of data from said function generator to said write-in, read-out means.

6. An orthogonal computer in accordance with claim 5, wherein said other vertical column of data is transferred directly from said write-in, read-out means to said function generator.

7. An orthogonal computer in accordance with claim 5, wherein said write-in, read-out means is adapted to simultaneously and selectively transfer said resultant vertical column to said memory, to said register and to said function generator, said function generator being capable of performing logic operations on the data transferred thereto while the write-in, read-out is transferring data to said memory and having data transferred from said memory to said write-in, read-out means.

8. An orthogonal computer in accordance with claim 4, including means for transferring another vertical column of data from said write-in, read-out means to said function generator, means for performing logic operations upon the two said vertical columns of data in said function generator to produce a resultant vertical column of data, and means for transferring said resultant vertical column of data from said function generator to at least one of said registers.

9. An orthogonal computer in accordance with claim 8, wherein said other vertical column of data is transferred directly from said write-in, read-out means to said function generator.

10. An orthogonal computer comprising:

a digital memory for data storage, a register, and a function generator, said memory having at least one data field in the form of horizontal data words stored therein, said data words being composed of a plurality of data bits, means for vertically addressing said digital memory, means for transferring vertical columns of data from at least one of said data fields stored in said memory to said register, means for transferring said vertical columns of data from said register to said function generator, means for performing logic operations upon said vertical columns of data in said function generator to produce resultant vertical columns of data, and means for transferring said resultant vertical columns of data from said function generator to said digital memory, whereby the time required to process the data in the data field is independent of the number of data words therein and dependent upon the number of data bits in the data field.

11. An orthogonal computer in accordance with claim 10, wherein the data bits in the data words of said data fields can be varied from 1 to X, where X is the total number of columns in the digital memory.

12. An orthogonal computer comprising:

a digital memory for data storage, a register, and a function generator, said memory being adapted to have at least one data field in the form of horizontal data words stored therein, said data words being composed of a plurality of data bits, means for vertically addressing said digital memory, means for horizontally addressing said digital memory, means for transferring vertical columns of data from at least one of said data fields stored in said memory to said register, means for transferring said vertical columns of data from said register to said function generator, means for performing logic operations upon said vertical columns of data in said function generator to produce resultant vertical columns of data, and means for transferring said resultant vertical columns of data from said function generator to said register, whereby the time required to process the data in the data field is independent of the number of data words therein and dependent upon the number of data bits in the data field.

13. An orthogonal computer in accordance with claim 12, wherein the data bits in the data words of said data fields can be varied from 1 to X, where X is the total number of columns in the digital memory.

14. An orthogonal computer in accordance with claim 1, including mask means operatively associated with said function generator to perform decision functions.

15. An orthogonal computer in accordance with claim 14, wherein said mask means is operative to selectively permit data transfer from said function generator to said digital memory and operative to selectively inhibit data transfer from said function generator to said digital memory.

16. An orthogonal computer in accordance with claim 2, including mask means operatively associated with said function generator to perform decision functions.

17. An orthogonal computer in accordance with claim 16, wherein said mask means is operative to selectively permit data transfer from said function generator to said register and operative to selectively inhibit data transfer from said function generator to said register.

18. In a computer having a digital memory, horizontal arithmetic unit with controls, and a horizontal memory control, the horizontal memory control being interconnected between said memory and said horizontal arithmetic unit with controls, the improvement comprising:
  a vertical arithmetic unit including a function generator and at least one register,
  write-in, read-out means for vertically writing in and reading out data from said digital memory in a selective manner,
  means including vertical controls interconnecting said horizontal arithmetic unit with controls and said vertical arithmetic unit,
  means for transferring vertical columns of data from said memory to said register,
  means for transferring said vertical columns of data from said register to said function generator,
  means for performing logic operations upon said vertical columns of data in said function generator to produce resultant vertical columns of data,
  means for transferring said resultant vertical columns of data from said function generator to said write-in, read-out means,
  and means operatively associated with said write-in, read-out means for selectively and simultaneously transferring said resultant vertical columns to said digital memory, to said register and to said function generator.

19. An orthogonal computer in accordance with claim 10, including mask means operatively associated with said function generator to perform decision functions.

20. An orthogonal computer in accordance with claim 19, wherein said mask means is operative to selectively permit data transfer from said function generator to said digital memory and operative to selectively inhibit data transfer from said function generator to said digital memory.

21. An orthogonal computer in accordance with claim 12, including mask means operatively associated with said function generator to perform decision functions.

22. An orthogonal computer in accordance with claim 21, wherein said mask means is operative to selectively permit data transfer from said function generator to said register and operative to selectively inhibit data transfer from said function generator to said register.

References Cited by the Examiner

UNITED STATES PATENTS

| | | | |
|---|---|---|---|
| 3,012,240 | 12/1961 | Klahn | 340—174 |
| 3,031,650 | 4/1962 | Koerner | 340—174 |
| 3,077,580 | 2/1963 | Underwood | 235—157 X |
| 3,098,153 | 7/1963 | Heijn | 235—175 |

OTHER REFERENCES

Lourie et al.: Arithmetic and Control Techniques in a Multiprogram Computer, Proceedings of the Eastern Joint Computer Conference, December 1959, pp. 75–81. (Copy in Group 240.)

Honeywell 800 Programmer's Reference Manual, 1960, pp. 24–32. (Copy in Group 240.)

ROBERT C. BAILEY, *Primary Examiner.*

MALCOLM MORRISON, *Examiner.*

G. D. SHAW, P. J. HENON, *Assistant Examiners.*